United States Patent [19]
Kim et al.

[11] 3,804,501
[45] Apr. 16, 1974

[54] REVERSING MECHANISM FOR MOTION PICTURE PROJECTORS

[75] Inventors: Raymond W. H. Kim; Jaroslav Cherniavskyj, both of Skokie, Ill.

[73] Assignee: Bell and Howell Company, Chicago, Ill.

[22] Filed: July 25, 1972

[21] Appl. No.: 275,066

[52] U.S. Cl. ............................. 352/173, 352/194
[51] Int. Cl. ............................................. G03b 1/00
[58] Field of Search ............................ 352/173, 194

[56] References Cited
UNITED STATES PATENTS
3,675,995 7/1972 Cherniavsky ...................... 352/173
3,261,654 7/1966 Faber ............................ 352/173 X

*Primary Examiner*—Monroe H. Hayes

[57] ABSTRACT

A reversing mechanism for a motion picture projector having movable gears for changing the phase relationship by 180° of the cams which drive the shuttle. One of the cams is moved 180° to permit the use of this mechanism with a shutter having any number of blades.

5 Claims, 3 Drawing Figures

PATENTED APR 16 1974 3,804,501
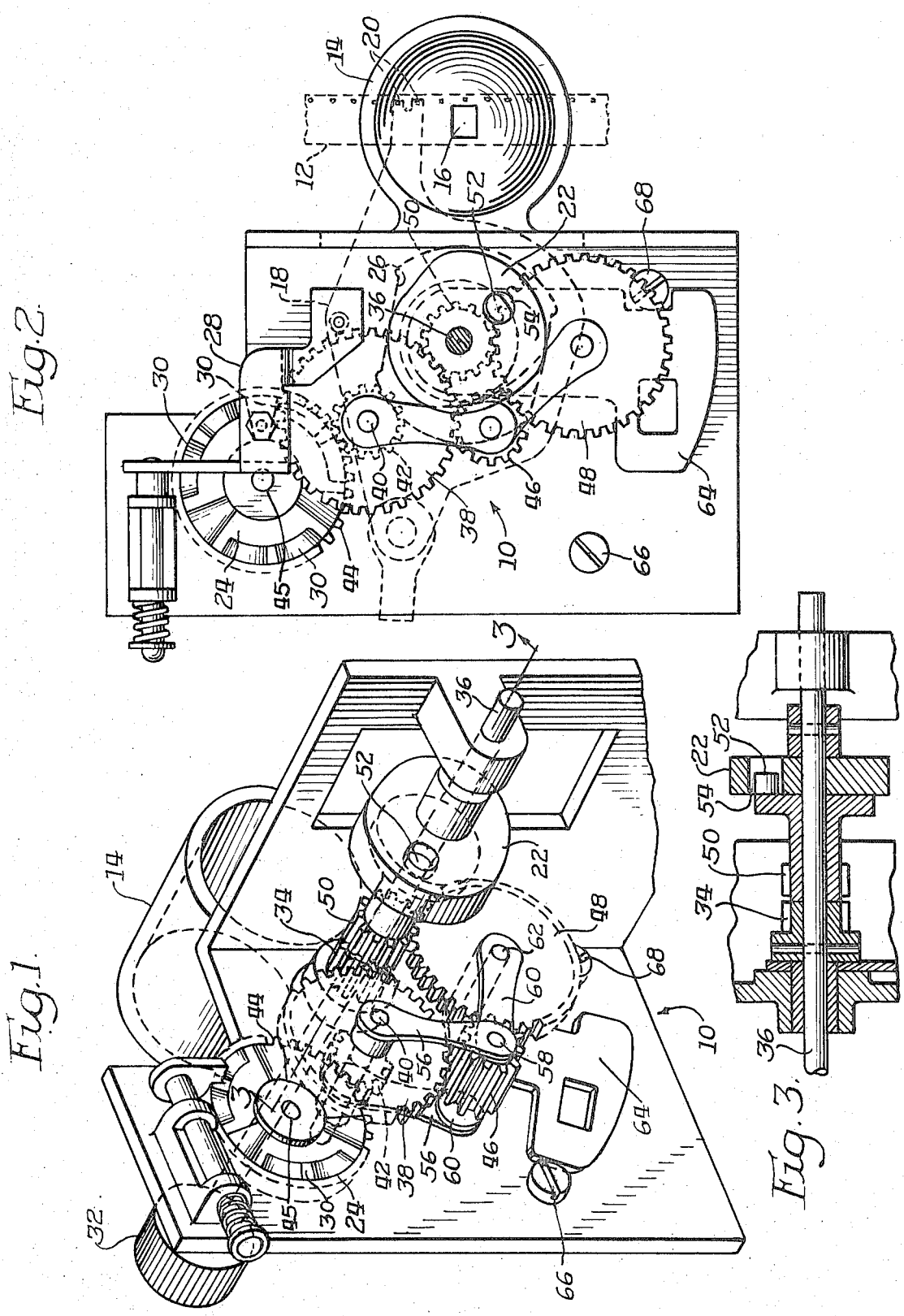

REVERSING MECHANISM FOR MOTION PICTURE PROJECTORS

BACKGROUND OF THE INVENTION

This invention relates to a motion picture apparatus and in particular to a reversible intermittent feed for motion picture projectors.

It is desirable to reverse the direction of film feed in a motion picture projector and in a motion picture camera. However, prior reversing mechanisms in projectors have relied upon reversing the drive train motion or have required disengaging mechanisms. Such mechanisms are both costly and complicated.

An improved reversing mechanism was presented in the present assignee's now U.S. Pat. No. 3,675,995. In that patent a reversing mechanism is disclosed in which the movement of planetary gears reverses film direction by changing the phase relationship of the in-and-out and up-and-down cams by 180°. However, the embodiment disclosed therein is limited to use with symmetrical shutters having an even number of blades.

SUMMARY OF THE INVENTION

This invention overcomes the disadvantages and limitations of the prior art in presenting a reversing mechanism which may be used with shutters having any number of blades. A shiftable gear train is provided to rotate the up-and-down cam 180° relative to the drive shaft upon which it is rotatably mounted. By moving the up-and-down cam 180° on the drive shaft the same shutter blade is used to block the projection light during film movement in both forward and reverse directions. Thus, the positioning of the remaining blades, if any, is of no consequence and the optimum number of shutter blades at a given drive shaft speed may be used.

BRIEF DESCRIPTION OF THE DRAWINGS

The features of this invention will become more apparent in the following description of a preferred embodiment read in conjunction with the FIGURES in which:

FIG. 1 is a perspective view of a reversing mechanism constructed in accordance with the principles of this invention and illustrated in the forward mode of operation.

FIG. 2 is a front view of the mechanism shown in FIG. 1, but shown in the reverse mode of operation.

FIG. 3 is a top view, partly in section, of the drive shaft and the components carried thereon.

DETAILED DESCRIPTION OF A PREFERRED EMBODIMENT

Referring to the Figures, wherein like reference numerals indicate like parts, the film moving portion of an intermittent pulldown projector is indicated generally at 10. A film 12 is positioned in front of a lamp 14 for movement past an aperture 16. The film 12 is intermittently moved by a shuttle 18 having claws 20 that engage holes in the film 12. For purposes of clarity the film 12 and the shuttle have been illustrated in phantom, but it is clear that they are in the front of FIG. 2. The shuttle 18 is mounted for both up-and-down and in-and-out movement. A shutter (not shown) would be fixed to the dirve shaft 36 and may have as many blades as desired.

Motion is imparted to the shuttle 18 by an up-and-down cam 22 and an in-and-out cam 24. The up-and-down cam 22 rides within an internal cam follower 26 formed in the shuttle 18. A cam follower 28 rides on the raised cam surfaces 30 formed on the in-and-out cam 24 and contacts the shuttle 18.

The cams 22, 24 are driven by a constant speed motor 32 through power transmission elements. A pinion 34 is rigidly connected to a rotatably mounted drive shaft 36. The pinion 34 meshes with an intermediate gear 38 mounted on a fixed axle 40. A reduction gear 42 is fixed to the intermediate gear 38 and meshes with the toothed periphery 44 of the in-and-out cam 24 to rotate it about a fixed axle 45. Thus the rotary motion of the drive shaft 36 is transmitted to the in-and-out cam 24 through gears 34, 38, 42 and 44.

A second set of gears is provided to rotate the up-and-down cam 22. A shifting idler gear 46 meshes with intermediate gear 38 and a shifting intermediate gear 48. Gear 48 drives pinion gear 50 which is rotatably mounted on the drive shaft 36. A lug 52 on gear 50 fits in a hole 54 formed in the up-and-down cam 22 which is rotatably mounted on the drive shaft 36. Thus, the up-and-down cam 22 is rotated through gears 46, 48 and 50 and lug 52 which is attached to gear 50.

The cams 22, 24 are rotated in a precise timed relationship to transport the film without damage. To effect this synchronism the gears must be accurately selected and designed. Of course, many combinations of sizes and numbers of teeth will synchronize the cams.

To reverse the direction of film transport, the phase relationship of the cams must be changed by 180°. To accomplish reversal in this preferred embodiment, gears 46 and 48 are movably mounted. A pair of links 56 are loosely mounted on axle 40 and the axle 58 which carries idler gear 46. Similarly, a second pair of links 60 are loosely mounted on axle 58 and axle 62 which carries gear 48. Thus axles 58 and 62 may be moved and of course move the gears 46 and 48 with them.

To move the gears 46 and 48, a lever 64 is pivoted about the drive shaft 36. The axle 62 which carries gear 48 is rigidly attached to the lever 64. The lever 64 moves between a stop 66 and a stop 68. The stops 66, 68 may be eccentrically shaped so that the limits of movement of lever 64 may be finely adjusted merely by turning the stops 66, 68 with a screwdriver or the like. The leftward limit of lever 64 is depicted in FIG. 1 and its rightward limit is depicted in FIG. 2.

Considering the projector to be turned off and being in the forward mode of operation in FIG. 1, the reversal operation will now be described. As the lever 64 moves from left to right or from the position shown in FIG. 1 to that shown in FIG. 2, idler gear 46 walks around stationary gear 38 and rotates counter-clockwise. The counter-clockwise rotation of idler gear 46 rotates intermediate gear 48 clockwise. The clockwise rotation of intermediate gear 48 and also its left-to-right movement cause pinion gear 50 and consequently up-and-down cam 22 to rotate counter clockwise.

The gears and lever are so arranged to rotate the up-and-down cam 22 through 180° as the lever 64 moves from the left stop 66 to the right stop 68. In this manner a 180° phase change has been effected because the in-and-out cam 24 is stationary. Exactly the same phase change is accomplished if the projector is running because the relative changes remain the same. The projector can be reversed or returned to forward projection without stopping the projector.

In this preferred embodiment the 180° phase change is accomplished by rotating the up-and-down cam 180°. However, it is obvious that either cam can be rotated relative to the other and the phase change could be effected by rotating both cams. Furthermore, only a 180° phase change need be accomplished and that could be done with greater and lesser rotations of appropriately configured cams.

The reversing operation is accomplished rapidly without the need for disengaging any portion of the drive mechanism. Furthermore, because the up-and-down cam is moved 180° relative to the drive shaft the same shutter blade blocks light during film movement regardless of whether the projector is being operated in a forward or reverse direction.

It can now be seen that this reversible intermittent feed is adaptable for use in motion picture cameras.

What is claimed is:

1. A motion picture projector for intermittently advancing a motion picture film past a projection aperture for the successive projection of images on the film comprising on combination:
   a shuttle tooth;
   means for mounting the shuttle tooth for in-and-out qnd up-and-down movement relative to the projection aperture to intermittently engage and advance the film past the aperture;
   rotary drive means comprising a drive shaft;
   an up-and-down cam for moving said tooth up and down relative to the aperture;
   an in-and-out cam for moving said tooth in and out relative to the aperture;
   one of said cams being rotatably mounted on said drive shaft; and
   reversing means for rotating said rotatably mounted cam to change the phase relation of said cams by 180° and thereby reverse the direction of film movement in the projector including:
   a first gear means for coupling said rotary drive means to one of said cams, a, second, movable gear means for coupling said first gear means to said rotatably mounted cam, and means for moving said second gear means for rotating said rotatably mounted cam and thereby shifting the phase relation between said cams by 180° to reverse the direction of movement of the film past the aperture.

2. The projector set forth in claim 1 wherein said first gear means includes a plurality of gears for transmitting the motion of said drive shaft to said in-and-out cam.

3. The projector set forth in claim 2 wherein said second gear means includes a plurality of gears coupling one of said plurality of gears in said first gear means to said up-and-down cam for transmitting the motion of said drive shaft to said up-and-down cam.

4. In an intermittent pull-down motion picture apparatus having drive means, a shuttle tooth, and up-and-down and in-and-out cams for moving the shuttle tooth the reversing mechanism comprising:
   a first gear means for transmitting motion from the drive means to one of the cams;
   movable second gear means, coupled to said first gear means, for transmitting motion from the drive means to the other of said cams; and
   means for moving said second gear means to rotate said other cam by 180° and thereby to shift the phase relation between said cams by 180° and reverse the direction of the film in the projector.

5. In an intermittent pull-down motion picture projector the combination comprising:
   a drive shaft;
   a shuttle tooth mounted for in-and-out and up-and-down movement to move film past an aperture;
   an in-and-out cam mounted for rotation to move said shuttle tooth;
   an up-and-down cam rotatably mounted on said drive shaft to move said shuttle tooth; and reversing means for rotating said up and down cam by 180° to change the phase relation between said cams by 180° and thereby reverse the direction of the film including:
   first gear means coupling said shaft to said in-and-out cam, second gear means coupling said first gear means to said up-and-down cam, and means for moving said second gear means to rotate said up-and-down cam and thereby shift the phase relation of said cams by 180° to reverse the direction of film movement.

* * * * *

UNITED STATES PATENT OFFICE
CERTIFICATE OF CORRECTION

Patent No. 3,804,501            Dated April 16, 1974

Inventor(s)  Raymond W. H. Kim et al.

It is certified that error appears in the above-identified patent and that said Letters Patent are hereby corrected as shown below:

Column 1, line 66, "dirve" should read -- drive --.

Column 3, line 24, "on" should read -- in --; line 27, "qnd" should read -- and --.

Signed and sealed this 15th day of October 1974.

(SEAL)
Attest:

McCOY M. GIBSON JR.           C. MARSHALL DANN
Attesting Officer            Commissioner of Patents